(No Model.)

H. S. LLOYD.
ELECTRODE FOR STORAGE BATTERIES.

No. 591,855. Patented Oct. 19, 1897.

Witnesses:
Jno. E. Parker
B. W. Peoples.

Inventor:
Herbert S. Lloyd,
by his Attorney.
Horace Pettit.

UNITED STATES PATENT OFFICE.

HERBERT S. LLOYD, OF PHILADELPHIA, PENNSYLVANIA.

ELECTRODE FOR STORAGE BATTERIES.

SPECIFICATION forming part of Letters Patent No. 591,855, dated October 19, 1897.

Application filed March 15, 1897. Serial No. 627,521. (No model.)

*To all whom it may concern:*

Be it known that I, HERBERT S. LLOYD, a citizen of the United States, and a resident of the city of Philadelphia, State of Pennsylvania, have invented certain new and useful Improvements in Electrodes for Storage Batteries, of which the following is a full, clear, and exact description, reference being had to the accompanying drawings, forming part of this specification.

My invention relates to certain improvements in storage batteries, and has for its object to provide a simple and economical form of electrode in which an extremely large surface area is exposed to the action of the electrolyte, as more fully set forth hereinafter.

Figure 1:
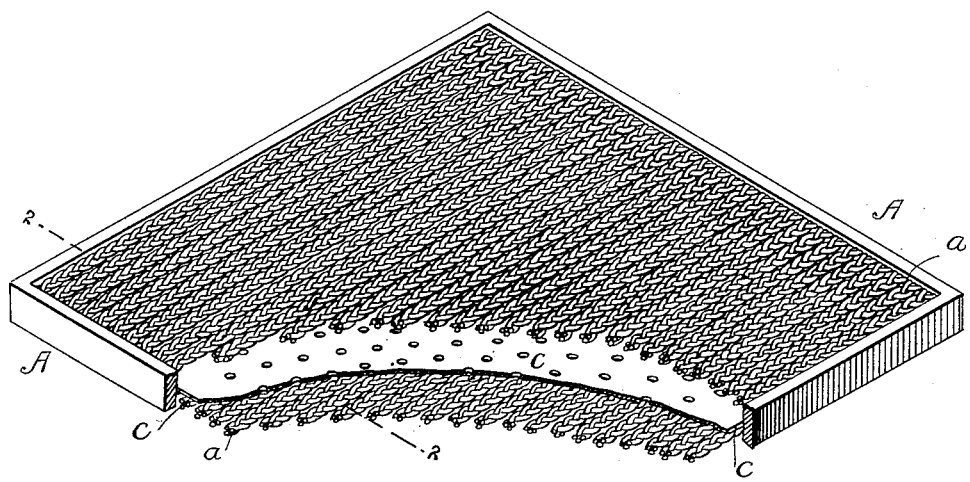
Figure 2:
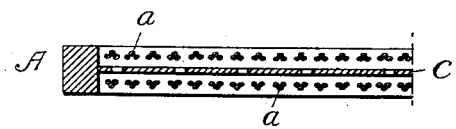
Figure 3:
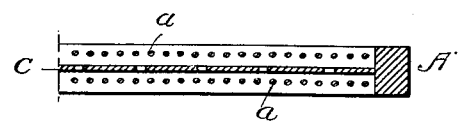

In the accompanying drawings, Figure 1 is a perspective view of an electrode constructed in accordance with my invention. Fig. 2 is a transverse sectional view of the same, on an enlarged scale, on the line 2 2, Fig. 1. Fig. 3 is a similar view illustrating a modification of the invention; and Fig. 4 is a sectional view of a portion of the electrode, illustrating the employment of a temporary division-plate in its manufacture.

The electrode forming the subject of my invention is formed of lead or an alloy of lead and antimony; and the object of the invention is to so construct the electrode as to expose an extremely large area to the action of the electrolyte. The electrode comprises a supporting-frame A, formed of lead or an alloy thereof, and between the opposite edges of the frame extend a series of plaited leaden rods or strips $a$, each strip being parallel with the other and preferably slightly out of contact with each other, so that the electrolyte may have access to the entire surface of each rod or strip. In larger electrodes where the length of the rods or strips $a$ would be likely to break I prefer to provide the frame with transverse partitions or ribs which divide the electrode into a series of sections, and in each section are placed the rods or strips $a$, as will be readily understood. In some instances the rods or strips may be woven together, or may be twisted or coiled to afford additional strength without material decrease in the exposure of the surface area of the single rods or strips. Between the two or more layers I place a perforated leaden plate $c$, as illustrated, the single or plaited rods or strips coming into contact therewith at times and being supported thereby to a considerable extent. The use of this intervening perforated plate is particularly advantageous in the upper of the two horizontally-disposed electrodes or in all cases where the electrodes are arranged in cells horizontally.

Figure 4:
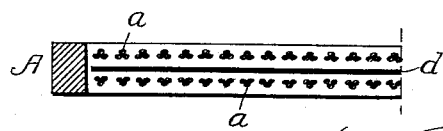

In Fig. 4 I have illustrated a construction in which a partition $d$, of cardboard, or other destructible material, is temporarily placed between the two layers of the electrode during the process of manufacture in order to prevent their coming into direct contact in the process of manufacture, and thus reduce the acting surface. When placed in the battery, the acid of the electrolyte immediately attacks this partition $d$ and destroys the same.

It is clear that the wires or strips of the electrode need not necessarily be plaited, woven, twisted, or coiled, as described, but be merely single strands, as shown in Fig. 3, stretched in series from opposite sides of the frame, though they are preferably plaited, twisted, coiled, woven, or so formed as to present the greatest possible surface for the action of the fluid.

The electrode above described is of very simple and economical construction, and the surface area exposed to the action of the electrolyte is much greater in proportion to the cubic contents of the electrode than in any of the ordinary electrodes with which I am familiar.

As the primary and secondary actions and reactions which take place during the discharge of a current into and from the battery are well known, it is not deemed necessary to describe them here, the present invention consisting in the construction of the electrode as described.

Having thus described my invention, what I claim, and desire to secure by Letters Patent, is—

1. An electrode comprising a frame, two or more layers or strips formed of lead or an alloy thereof extending between the side bars of the frame, and a perforated leaden plate situated between such layers, substantially as specified.

2. An electrode comprising a frame and two layers of rods or strips of lead or an alloy thereof, said rods or strips being plaited in series and extending between the side bars of the frame, and a perforated leaden plate situated between the said layers, substantially as specified.

In witness whereof I have hereunto set my hand this 11th day of March, A. D. 1897.

HERBERT S. LLOYD.

Witnesses:
 JNO. E. PARKER,
 FREDK. G. WARREN.